(12) United States Patent
Sattler et al.

(10) Patent No.: US 7,831,568 B2
(45) Date of Patent: Nov. 9, 2010

(54) DATA MIGRATION

(75) Inventors: Juergen Sattler, Wiesloch (DE); Joachim Gaffga, Wiesloch (DE); Werner Wolf, Wiesloch (DE); Robert Viehmann, Waghausl (DE); Frank Markert, Grossostheim (DE)

(73) Assignee: SAP AG, Walldorf (DE)

( * ) Notice: Subject to any disclaimer, the term of this patent is extended or adjusted under 35 U.S.C. 154(b) by 843 days.

(21) Appl. No.: 11/512,520

(22) Filed: Aug. 29, 2006

(65) Prior Publication Data

US 2008/0126375 A1    May 29, 2008

(51) Int. Cl.
*G06F 17/30* (2006.01)
(52) U.S. Cl. ...................................... 707/674
(58) Field of Classification Search .............. 707/3, 707/5, 203, 674; 709/204
See application file for complete search history.

(56) References Cited

U.S. PATENT DOCUMENTS

| | | | |
|---|---|---|---|
| 4,079,452 A | 3/1978 | Larson et al. |
| 4,501,528 A | 2/1985 | Knapp |
| 5,307,499 A | 4/1994 | Yin |
| 5,459,868 A | 10/1995 | Fong |
| 5,680,624 A | 10/1997 | Ross |
| 5,754,845 A | 5/1998 | White |
| 5,758,062 A | 5/1998 | McMahon et al. |
| 5,857,102 A | 1/1999 | McChesney et al. |
| 5,978,579 A | 11/1999 | Buxton et al. |
| 6,044,461 A | 3/2000 | Agha et al. |
| 6,067,525 A | 5/2000 | Johnson et al. |
| 6,128,730 A | 10/2000 | Levine |
| 6,161,123 A | 12/2000 | Renouard et al. |
| 6,161,176 A | 12/2000 | Hunter et al. |
| 6,185,587 B1 | 2/2001 | Bernardo et al. |
| 6,189,139 B1 | 2/2001 | Ladd |
| 6,301,710 B1 | 10/2001 | Fujiwara |
| 6,324,578 B1 | 11/2001 | Cox et al. |
| 6,397,232 B1 | 5/2002 | Cheng-Hung et al. |
| 6,449,624 B1 | 9/2002 | Hammack et al. |
| 6,453,302 B1 | 9/2002 | Johnson et al. |
| 6,466,972 B1 | 10/2002 | Paul et al. |
| 6,470,464 B2 | 10/2002 | Bertram et al. |
| 6,513,045 B1 | 1/2003 | Casey et al. |

(Continued)

FOREIGN PATENT DOCUMENTS

| | | |
|---|---|---|
| JP | 2004287972 A | 10/2004 |
| WO | WO-2004114130 A2 | 12/2004 |
| WO | WO-2005045670 A1 | 5/2005 |

OTHER PUBLICATIONS

"U.S. Appl. No. 11/512,609, Non-Final Office Action mailed Apr. 27, 2009", 15 pgs.

(Continued)

*Primary Examiner*—Etienne P LeRoux
(74) *Attorney, Agent, or Firm*—Schwegman, Lundberg & Woessner, P.A.

(57) ABSTRACT

The present subject matter relates to configuring computer systems and, more particularly, to data migration. Various embodiments of the present subject matter provide systems, methods, and software to receive and store customer information including information detailing customer data from legacy applications. Some embodiments further determine a plan to migrate the customer data from the legacy applications to a target application as a function of the received customer information and the target application.

17 Claims, 5 Drawing Sheets

U.S. PATENT DOCUMENTS

| | | |
|---|---|---|
| 6,523,027 B1 | 2/2003 | Underwood |
| 6,539,372 B1 | 3/2003 | Casey et al. |
| 6,538,668 B1 | 5/2003 | Ruberg et al. |
| 6,728,877 B2 | 4/2004 | Mackin et al. |
| 6,804,709 B2 | 10/2004 | Manjure et al. |
| 6,810,401 B1 | 10/2004 | Thompson et al. |
| 6,868,392 B1 | 3/2005 | Ogasawara |
| 7,031,951 B2 | 4/2006 | Mancisidor et al. |
| 7,181,731 B2 | 2/2007 | Pace et al. |
| 7,228,326 B2 | 6/2007 | Srinivasan et al. |
| 7,299,382 B2 | 11/2007 | Jorapur |
| 7,340,411 B2 | 3/2008 | Cook |
| 7,360,211 B2 | 4/2008 | Hyden et al. |
| 7,376,682 B2 | 5/2008 | Ramacher et al. |
| 7,426,694 B2 | 9/2008 | Gross et al. |
| 7,487,231 B2 | 2/2009 | Brown et al. |
| 7,526,457 B2 | 4/2009 | Duevel et al. |
| 7,540,014 B2 | 5/2009 | Vasishth et al. |
| 7,593,124 B1 | 9/2009 | Sheng et al. |
| 7,599,895 B2 | 10/2009 | Nugent |
| 7,606,840 B2 | 10/2009 | Malik |
| 7,610,582 B2 | 10/2009 | Becker et al. |
| 7,617,256 B2 | 11/2009 | Mohamed et al. |
| 7,640,542 B2 | 12/2009 | Herenyi et al. |
| 7,657,887 B2 | 2/2010 | Kothandaraman et al. |
| 7,665,082 B2 | 2/2010 | Wyatt et al. |
| 7,685,577 B2 | 3/2010 | Pace et al. |
| 7,716,634 B2 | 5/2010 | Ross et al. |
| 7,725,877 B2 | 5/2010 | Andrade et al. |
| 2001/0044834 A1 | 11/2001 | Bradshaw et al. |
| 2001/0054091 A1 | 12/2001 | Lenz et al. |
| 2002/0026572 A1 | 2/2002 | Joory |
| 2002/0095663 A1 | 7/2002 | Joory |
| 2002/0099578 A1 | 7/2002 | Eicher et al. |
| 2002/0116373 A1 | 8/2002 | Nishikawa et al. |
| 2002/0138570 A1* | 9/2002 | Hickey ............... 709/204 |
| 2002/0147784 A1 | 10/2002 | Gold et al. |
| 2002/0188625 A1* | 12/2002 | Jans et al. ............. 707/203 |
| 2003/0005411 A1 | 1/2003 | Gerken |
| 2003/0115292 A1 | 6/2003 | Griffin et al. |
| 2003/0135842 A1 | 7/2003 | Frey et al. |
| 2003/0227392 A1 | 12/2003 | Ebert et al. |
| 2003/0237093 A1 | 12/2003 | Marsh et al. |
| 2004/0019669 A1 | 1/2004 | Viswanath et al. |
| 2004/0019670 A1 | 1/2004 | Viswanath et al. |
| 2004/0060047 A1 | 3/2004 | Talati et al. |
| 2004/0088691 A1 | 5/2004 | Hammes et al. |
| 2004/0111417 A1 | 6/2004 | Goto et al. |
| 2004/0176996 A1 | 9/2004 | Powers et al. |
| 2004/0186927 A1 | 9/2004 | Eryurek et al. |
| 2004/0268342 A1 | 12/2004 | Hyden et al. |
| 2005/0007964 A1 | 1/2005 | Falco et al. |
| 2005/0044215 A1 | 2/2005 | Cohen et al. |
| 2005/0044546 A1 | 2/2005 | Niebling et al. |
| 2005/0080801 A1 | 4/2005 | Kothandaraman et al. |
| 2005/0086195 A1 | 4/2005 | Tan et al. |
| 2005/0108219 A1 | 5/2005 | De La Huerga |
| 2005/0108707 A1 | 5/2005 | Taylor et al. |
| 2005/0138558 A1 | 6/2005 | Duevel et al. |
| 2005/0160419 A1 | 7/2005 | Alam et al. |
| 2005/0188422 A1 | 8/2005 | Jooste |
| 2005/0193103 A1 | 9/2005 | Drabik |
| 2005/0262076 A1 | 11/2005 | Voskuil |
| 2005/0262499 A1 | 11/2005 | Read |
| 2005/0268282 A1 | 12/2005 | Laird |
| 2005/0278202 A1 | 12/2005 | Broomhall et al. |
| 2005/0278280 A1 | 12/2005 | Semerdzhiev et al. |
| 2006/0047793 A1 | 3/2006 | Agrawal et al. |
| 2006/0184917 A1 | 8/2006 | Troan et al. |
| 2006/0224637 A1 | 10/2006 | Wald |
| 2006/0234698 A1 | 10/2006 | Fok et al. |
| 2006/0248450 A1 | 11/2006 | Wittenberg et al. |
| 2006/0253588 A1 | 11/2006 | Gao et al. |
| 2007/0006161 A1 | 1/2007 | Kuester et al. |
| 2007/0025704 A1 | 2/2007 | Tsukazaki et al. |
| 2007/0074203 A1 | 3/2007 | Curtis et al. |
| 2007/0093926 A1 | 4/2007 | D. Braun et al. |
| 2007/0097975 A1* | 5/2007 | Rakers et al. ............... 370/392 |
| 2007/0157185 A1 | 7/2007 | Semerdzhiev et al. |
| 2007/0157192 A1 | 7/2007 | Hoefler et al. |
| 2007/0168065 A1 | 7/2007 | Nixon et al. |
| 2007/0198437 A1 | 8/2007 | Eisner et al. |
| 2007/0234274 A1 | 10/2007 | Ross et al. |
| 2007/0257715 A1 | 11/2007 | Semerdzhiev et al. |
| 2008/0059474 A1 | 3/2008 | Lim |
| 2008/0059490 A1 | 3/2008 | Sattler et al. |
| 2008/0059537 A1 | 3/2008 | Sattler et al. |
| 2008/0059630 A1 | 3/2008 | Sattler et al. |
| 2008/0071555 A1 | 3/2008 | Sattler et al. |
| 2008/0071718 A1 | 3/2008 | Sattler et al. |
| 2008/0071828 A1 | 3/2008 | Sattler et al. |
| 2008/0071839 A1 | 3/2008 | Sattler et al. |
| 2008/0082517 A1 | 4/2008 | Sattler et al. |
| 2008/0126448 A1 | 5/2008 | Sattler et al. |
| 2008/0127082 A1 | 5/2008 | Birimisa et al. |
| 2008/0127084 A1 | 5/2008 | Sattler et al. |
| 2008/0127085 A1 | 5/2008 | Sattler et al. |
| 2008/0127086 A1 | 5/2008 | Sattler et al. |
| 2008/0127123 A1 | 5/2008 | Sattler et al. |
| 2008/0195579 A1 | 8/2008 | Kennis et al. |
| 2009/0024990 A1 | 1/2009 | Singh et al. |
| 2009/0157455 A1 | 6/2009 | Kuo et al. |
| 2010/0082518 A1 | 4/2010 | Gaffga et al. |
| 2010/0153443 A1 | 6/2010 | Gaffga et al. |
| 2010/0153468 A1 | 6/2010 | Lange et al. |

OTHER PUBLICATIONS

"U.S. Appl. No. 11/512,443, Final Office Action mailed Feb. 6, 2009", 20 pgs.

"U.S. Appl. No. 11/512,516, Non-Final Office Action mailed Feb. 4, 2009", 12 pgs.

"U.S. Appl. No. 11/512,516, Response filed Apr. 28, 2009 to Non Final Office Action mailed Feb. 4, 2009", 16 pgs.

"U.S. Appl. No. 11/512,517, Notice of Allowance mailed Apr. 3, 2009", 10 pgs.

"U.S. Appl. No. 11/512,519, Final Office Action mailed Feb. 2, 2009", 14 pgs.

"U.S. Appl. No. 11/512,609, Response filed Feb. 17, 2009 to Final Office Action mailed Dec. 8, 2008", 10 pgs.

"U.S. Appl. No. 11/512,886 Response filed Mar. 25, 2009 to Non Final Office Action mailed Dec. 26, 2008", 9 pgs.

"U.S. Appl. No. 11/512,517, Response to Non-Final Office Action mailed Jan. 29, 2009", 16 pgs.

"U.S. Appl. No. 11/512,609, Final Office Action mailed Dec. 8, 2008", 12 pgs.

"U.S. Appl. No. 11/512,884, Final Office Action mailed Dec. 19, 2008", 11 pgs.

"U.S. Appl. No. 11/512,886, Non-Final Office Action mailed Dec. 26, 2008", 10 pgs.

"International Application Serial No. PCT/EP2007/007461, International Search Report mailed Feb. 5, 2008", 8 pgs.

"International Application Serial No. PCT/EP2007/007461, Written Opinion mailed Feb. 5, 2008", 9 pgs.

"International Application Serial No. PCT/EP2007/007462, International Search Report Mailed Mar. 17, 2008", 7 pgs.

"International Application Serial No. PCT/EP2007/007462, Written Opinion Mailed Mar. 17, 2008", 8 pgs.

"International Application Serial No. PCT/EP2007/007490, International Search Report mailed Jan. 24, 2008", 7 pgs.

"International Application Serial No. PCT/EP2007/007490, Written Opinion mailed Jan. 24, 2008", 9 pgs.

"International Application Serial No. PCT/EP2007/007515, International Search Report mailed Jan. 24, 2008", 8 pgs.

"International Application Serial No. PCT/EP2007/007515, Written Opinion mailed Jan. 24, 2008", 12 pgs.
"U.S. Appl. No. 11/512,443, Response filed Oct. 9, 2008 to Non-Final Office Action mailed Jul. 9, 2008", 11 pgs.
"U.S. Appl. No. 11/512,443, Non-Final Office Action mailed Jul. 9, 2008", 17 pgs.
"U.S. Appl. No. 11/512,517, Non-Final Office Action mailed Oct. 29, 2008", 13 pgs.
"U.S. Appl. No. 11/512,519 response filed Nov. 11, 2008 to Non-Final Office Action mailed Sep. 11, 2008", 15 pgs.
"U.S. Appl. No. 11/512,519, Non-FinalOffice Action mailed Sep. 11, 2008", 14 pgs.
"U.S. Appl. No. 11/512,609, Non Final Office Action mailed on Jun. 19, 2008", 9 pgs.
"U.S. Appl. No. 11/512,609, Response filed Sep. 19, 2008 to Non-Final Office Action mailed Jun. 19, 2008", 8 pgs.
"U.S. Appl. No. 11/512,884, Non-Final Office Action Mailed Jul. 29, 2008", 12 pgs.
"U.S. Appl. No. 11/512,884, Response filed Sep. 23, 2008 to Non-Final Office Action mailed Jul. 29, 2008", 17 pgs.
Liu, et al., "A Knowledge-Based Approach to Requirements Analysis", (1995).
"International Application Serial No. PCT/EP2007/007460, International Search Report Nov. 2, 2007", 5 pgs.
"International Application Serial No. PCT/EP2007/007460, Written Opinion Nov. 2, 2007", 7 pgs.
"International Application Serial No. PCT/EP2007/007461. International Search Report Nov. 26, 2007", 7 pgs.
"International Application Serial No. PCT/EP2007/007462, Partial International Search Report Dec. 27, 2007", 8 pgs.
"International Application Serial No. PCT/EP2007/007490, International Search Report Oct. 26, 2007", 4 pgs.
"International Application Serial No. PCT/EP2007/007491, International Search Report Oct. 22, 2007", 5 pgs.
"International Application Serial No. PCT/EP2007/007491, Written Opinion Oct. 22, 2007", 6 pgs.
"International Application Serial No. PCT/EP2007/007515, International Search Report Nov. 12, 2007", 8 pgs.
Indigorose, "Setup Factory", *User's Guide IndigoRose Software Design No. 2*, (Mar. 1998),82 pgs.
"U.S. Appl. No. 11/512,442 Non Final Office Action Mailed Oct. 1, 2009", 15 pgs.
"U.S. Appl. No. 11/512,443, Non-Final Office Action mailed Jun. 26, 2009", 14 pgs.
"U.S. Appl. No. 11/512,443, Response filed Apr. 3, 2009 to Final Office Action mailed Feb. 6, 2009", 13 pgs.
"U.S. Appl. No. 11/512,443, Response filed Sep. 28, 2009 to Non Final Office Action mailed Jun. 26, 2009", 16 pgs.
"U.S. Appl. No. 11/512,516, Non-Final Office Action mailed Jul. 10, 2009", 15 Pgs.
"U.S. Appl. No. 11/512,516, Response filed Oct. 9, 2009 to Non Final Office Action mailed Jul. 10, 2009", 9 pgs.
"U.S. Appl. No. 11/512,609, Response filed Jul. 24, 2009 to Non Final Office Action mailed Apr. 27, 2009", 11 pgs.
"U.S. Appl. No. 11/512,886, Final Office Action mailed Jun. 24, 2009", 11 pgs.
"U.S. Appl. No. 11/512,886, Response filed Sep. 22, 2009 to Final Office Action mailed Jun. 24, 2009", 10 pgs.
"U.S. Appl. No. 11/512,517, Non-Final Office Action mailed Sep. 16, 2009", 16 Pgs.
"U.S. Appl. No. 11/512,442, Response filed Jan. 4, 2010 to Non Final Office Action mailed Oct. 1, 2009", 10 pgs.
"U.S. Appl. No. 11/512,443, Examiner Interview Summary mailed Oct. 7, 2009", 4 pgs.
"U.S. Appl. No. 11/512,443, Final Office Action mailed Jan. 22, 2010", 14 pgs.
"U.S. Appl. No. 11/512,516, Final Office Action mailed Mar. 5, 2010", 16 pgs.
"U.S. Appl. No. 11/512,517, Examiner Interview Summary mailed Dec. 24, 2009", 3 pgs.
"U.S. Appl. No. 11/512,517, Notice of Allowance mailed Jan. 21, 2010", 8 pgs.
"U.S. Appl. No. 11/512,517, Response filed Dec. 14, 2009 to Non Final Office Action mailed Sep. 16, 2009", 8 pgs.
"U.S. Appl. No. 11/512,609, Final Office Action mailed Nov. 20, 2009", 15 pgs.
"U.S. Appl. No. 11/512,886, Examiner Interview Summary mailed Sep. 29, 2009", 2 pgs.
"U.S. Appl. No. 11/512,886, Notice of Allowance mailed Dec. 24, 2009", 8 pgs.
"European Application Serial No. 09012347.2, Extended European Search Report mailed Nov. 26, 2009", 5 pgs.
"U.S. Appl. No. 11/512,442, Final Office Action mailed Apr. 21, 2010", 13 pgs.
"U.S. Appl. No. 11/512,443, Response filed Apr. 22, 2010 to Final Office Action mailed Jan. 22, 2010", 12 pgs.
"U.S. Appl. No. 11/512,457, Non-Final Office Action mailed May 13, 2010", 11 pgs.
"U.S. Appl. No. 11/512,516, Response filed Apr. 30, 2010 to Final Office Action mailed Mar. 5, 2010", 9 pgs.
"U.S. Appl. No. 11/512,608, Non-Final Office Action mailed May 12, 2010", 12 pgs.
Krintz, Chandra J., "Reducing load delay to improve performance of Internet-computing programs", *University of California*, San Diego, (2001), 225 pgs.
"U.S. Appl. No. 11/511,357, Non-Final Office Action mailed Jul. 2, 2010", 11 pgs.
"U.S. Appl. No. 11/512,440, Non-Final Office Action mailed Jun. 17, 2010", 14 pgs.
"U.S. Appl. No. 11/512,441, Non-Final Office Action mailed Jun. 21, 2010", 8 pgs.
"U.S. Appl. No. 11/512,442, Response filed Jun. 21, 2010 to Final Office Action mailed Apr. 21, 2010", 9 pgs.
"U.S. Appl. No. 11/512,457 Notice of Allowance mailed Aug. 13, 2010", 13 pgs.
"U.S. Appl. No. 11/512,457, Response filed Aug. 5, 2010 to Non Final Office Action mailed May 13, 2010", 10 pgs.
"U.S. Appl. No. 11/512,516 Non-Final Office Action mailed Jul. 8, 2010", 20 pgs.
"U.S. Appl. No. 11/512,517, Non-Final Office Action mailed Aug. 16, 2010", 30 pgs.
"U.S. Appl. No. 11/512,518, Non-Final Office Action mailed May 27, 2010", 14 pgs.
"U.S. Appl. No. 11/512,518, Response filed Aug. 24, 2010 to Non Final Office Action mailed May 27, 2010", 10 pgs.
"U.S. Appl. No. 11/512,608, Notice of Allowance mailed Aug. 13, 2010", 9 pgs.
"U.S. Appl. No. 11/512,608, Response filed Aug. 5, 2010 to Non Final Office Action mailed May 12, 2010", 10 pgs.
Bellissard, Luc, et al., "Component-based Programming and Application Management with Olan, Proceedings of Workshop on Distributed Computing", Retrieved on [Jun. 15, 2010] Retrieved from the Internet: URL<http://www.springerlink.com/contenUf2g8rI4083393124/fuIitext.pdf>, (1995).
Dotoli, et al., "A decision support system for the supply chain configuration", IEEE, (Oct. 8, 2003), 6 pgs.
Gu, Mingyang, et al., "Component Retrieval Using Conversational Case-Base Reasoning", IEA/AIE, Annecy, France, (Jun. 27-30, 2006), 12 pgs.
Hwang, Jeong Hee, et al., "Context Based Recommendation Service in Ubiquitous Commerce", Database Laboratory, Chungbuk National University, Korea, Springer - Verlag Berlin Heidelberg,, (2005).
Kahl, Fredrik, et al., "Critical configurations for n-view projective reconstruction", IEEE, (Dec. 14, 2001), 6 pgs.
Park, Young, "Software retrieval by samples using concept analysis", Journal of Systems and Software 54, (2000), 179-183.
Virgilo, "A Rule-based Approach to Content Delivery Adaptation in Web Information Systems", Proc. 7th International Conference on Mobile Data Management, IEEE, (May 12, 2006), 4 pgs.
US 7,571,147, 08/2009, Sattler et al. (withdrawn)
US 7,730,006, 06/2010, Wiesloch et al. (withdrawn)

* cited by examiner

DATA MIGRATION

TECHNICAL FIELD

The present subject mater relates to configuring computer systems and, more particularly, to data migration.

BACKGROUND INFORMATION

As software applications are used by organizations, large amounts of data are generated and stored. With many applications, the data is stored in a proprietary format of the application used to generate the data. Other applications store data in proprietary database architectures. Thus over time, it becomes more and more difficult for an organization to transition to different applications.

The difficulty of transitioning between applications can come from the size of effort necessary to move data from legacy systems to a new system. The size of effort can require a large amount of human resources, time, and cost. Further, there can be exposure for an organization choosing to transition to a new application. As a result, not only are organizations discouraged from such transitions due to difficulties related to the scale of such projects, organizations that are not comfortable with the exposure are even more reluctant to make an application transition.

Thus, absent a solution that can reduce application transition difficulties, cost, and exposure, organizations will continue to be reluctant to transition from legacy applications.

DETAILED DESCRIPTION

The embodiments described herein provide solutions to many of the issues involved with transitioning between software applications, such as Enterprise Resource Planning ("ERP") applications. Some of these embodiments may obtain information descriptive of an organization's legacy systems. These embodiments may further obtain information descriptive of how the organization would utilize a new application. A data migration planning method may then propose a data migration plan to move or copy data from legacy systems to the new application if implemented. However, some embodiments may include proposing a data integration plan that allows all or part of the legacy data to remain where it is currently stored, but directs the new application to access the data from that location.

In some embodiments, this data migration plan may propose use of application "plugins" that may execute within, or on the data of, the legacy application to move or copy data to the new application. The data migration process may also propose use of other data migration tools or processes. Some such proposed processes may include a proposed manual process that specifies a file format to extract from a legacy system. Some such proposals may specify the file format to extract based on a process that may be executed to import a file to the new application according to the specified format. In other embodiments, the data migration plan may provide instructions for manually causing a file extracted according to the specified format to the new application.

In some embodiments, the data migration planner may included as a part of a new application to be transitioned to. However, the architecture of the data migration planner allows augmentation by third parties. Such augmentation may include additional data migration requirements, data migration tools, legacy system identification questions, and other items as provided by third parties.

Such embodiments may reduce, or at least mask, the complexity of such application transitions. Further, utilization of existing tools that have not only been tested, but also previously used to make such application transitions, mitigates exposure from such large projects. Additionally, if an organization chooses to follow the data migration plan, the skill of a user executing the plan may be lower because the amount of experience and skill necessary to move or copy the data are minimized. These and other embodiments are described in greater detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, electrical, or other changes may be made without departing from the scope of the inventive subject matter. Such embodiments of the inventive subject matter may be referred to, individually and/or collectively, in the present application by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described in the present application are implemented in hardware, software or a combination of software and hardware in one or more embodiments. The software comprises computer executable instructions stored on computer readable media such as memory or other type of storage devices. Further, such functions correspond to modules, which may be one or more, or a combination of, software, hardware, or firmware. Multiple functions are performed in one or more modules as desired, and the embodiments described are merely examples. The software may be executed on a digital signal processor, ASIC, microprocessor, or other type of processor operating on a system, such as a personal computer, server, a router, or other device capable of processing data including devices interconnected by a network.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, electrical, or other changes may be made without departing from the scope of the inventive subject matter. Such embodiments of the inventive subject matter may be referred to, individually and/or collectively, in the present application by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described in the present application are implemented in hardware, software or a combination of software and hardware in one or more embodiments. The software comprises computer executable instructions stored on computer readable media such as memory or other type of storage devices. Further, such functions correspond to modules, which may be one or more, or a combination of, software, hardware, or firmware. Multiple functions are performed in one or more modules as desired, and the embodiments described are merely examples. The software may be executed on a digital signal processor, ASIC, microprocessor, or other type of processor operating on a system, such as a personal computer, server, a router, or other device capable of processing data including devices interconnected by a network.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
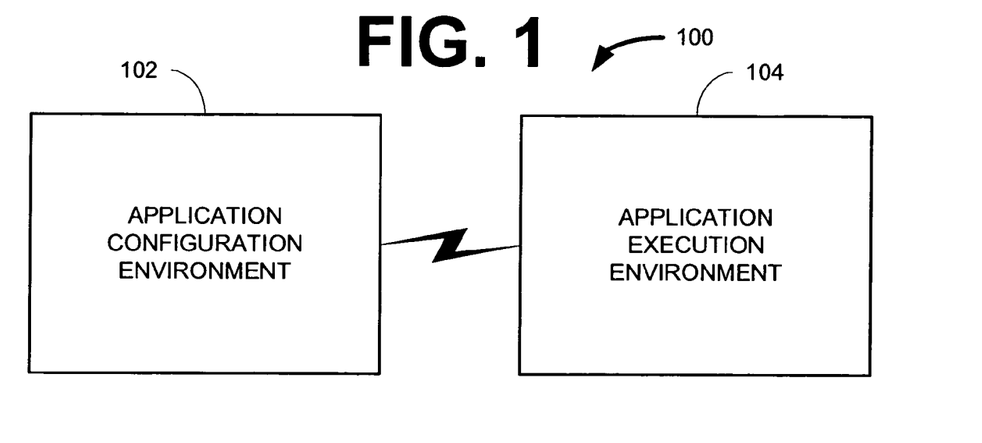
FIG. 1 is a block diagram of a system according to an example embodiment.

FIG. 1 is a block diagram of a system 100 according to an example embodiment. The system 100 includes an application configuration environment 102 and an application execution environment 104.

The application configuration environment 102 is a system 100 environment within which an application can be configured. However, the application will, or does, execute within the application execution environment 104. In some embodiments, this arrangement of the application configuration environment 102 and the application execution environment 104 separates the configuration of an application from the environment within which it executes. When an application configuration has been established, all or part of the configuration can then be deployed to the application execution environment 104. This deployment can occur to one or more separate instance of the application in the application execution environment 104. Although only a single application execution environment 104 is illustrated, multiple application execution environments 104 can exist, and the deployment can be made to one or more of the multiple application execution environments 104.

Figure 2A:
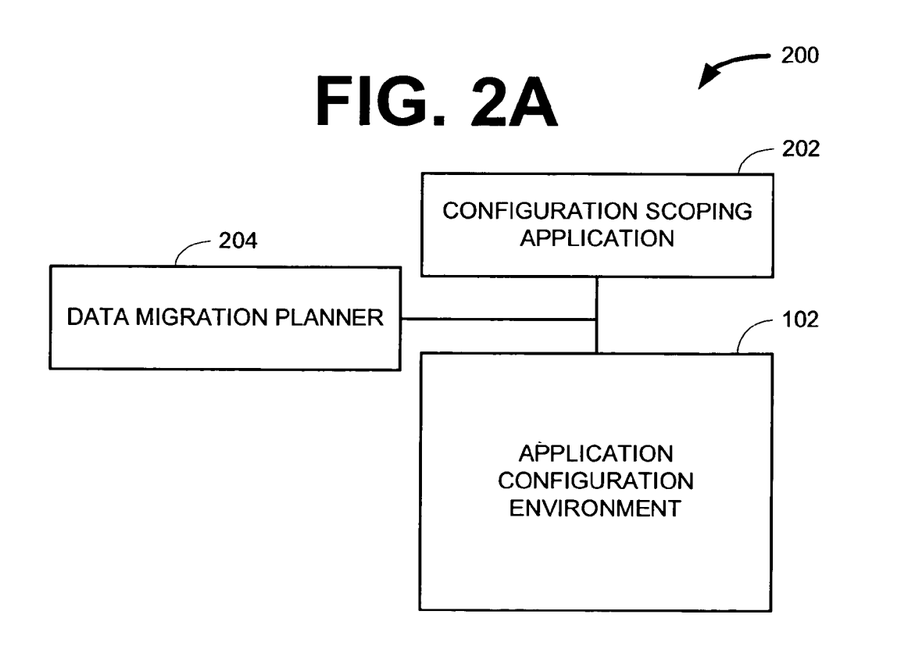
FIG. 2A is a block diagram of a system according to an example embodiment.

FIG. 2A is a block diagram of a system 200 according to an example embodiment. The system 200 includes a configuration scoping application 202, a data migration planner application 204, and the application configuration environment 102.

The configuration scoping application 202 typically is a software tool that executes on a computing device, such as a portable computer, on a same computing device within which the application configuration environment 102 exists, or on another computing device that can be communicatively coupled to the application configuration environment 102.

The configuration scoping application 202, when executed, typically presents a set of scoping questions to a user. The scoping questions ma be linked to one of many adaptation catalog entries. The adaptation catalog entries may include a representation of all of the solution capabilities of an application to be configured, and eventually executed. In some embodiments, the solution capabilities are hierarchically divided into areas, packages, topics, and options. There may be multiple areas, and each area may have multiple packages. Each package may have multiple topics, and each topic may have multiple options.

In some embodiments, such as in an example embodiment where the application to be configured is an ERP application, the adaptation catalog may provide in the area Sales, a package Customer Order Management that contains the topics Sales Order Quote, Sales Order, Sales Order Analysis, and others. On that level, one or more options typically exist such as Approval Processing.

In the configuration scoping application 202, as stated above, scoping question may be linked to an adaptation catalog entry. An adaptation catalog entry further includes a rule. These rules typically model dependencies between the areas, packages, topics, and options and corresponding solution capabilities of the application. A rule can may specify required inclusion or exclusion of other areas, packages, topics, or options, or may require specification of further areas, packages, topics, or options. A rule may also specify a recommendation or default area, package, topic, or option.

For example, a first example scoping question, "What is the primary focus of your business?" may have three possible answers including "Sales," "Service," and "Logistics." Such a first scoping question typically is aimed at identifying an area of business in which the application is going to be used. Answering "Sales" typically tells the configuration scoping application 202 that the area is "Sales" and a rule tied to the adaptation catalog entry for "Sales" specifies dependencies with packages, topics, and options and the corresponding solution capabilities of the application necessary or optional in using the application in a sales business. Such a rule can also specify that other packages, topics, and options and the corresponding solution capabilities be excluded.

Thus, when a user answers scoping questions, the configuration of the application is being performed. Further, when a question is answered that is associated with an adaptation catalog entry having a rule that excludes another area, package, topic, or option, that rule may be applied to eliminate questions from consideration. Conversely, when a question is answered that is associated with an adaptation catalog entry having a rule that requires another area, package, topic, or option, that same rule may be applied to determine a next question, or group of questions, to ask a user. However, in the event that a question is not answered that is linked to a rule providing defaults, the question may be skipped without adversely affecting the application configuration.

In some embodiments, such as the embodiment of the system 200, the scoping questions further include a group of questions that request information regarding legacy systems to be replaced or augmented by an application. This group of questions requests and receives input through one or more user interfaces of the configuration scoping application 202. The answers to these questions identify systems, applications operating the systems, and data stores, such as databases, file storage, and other data storage mechanisms, that hold data on the systems that is accessed by the applications. In some embodiments, the questions further receive data necessary for connecting to the data stores. This information, once obtained, is made available to the data migration planner 204, which determines, and provides as output, a data migration plan to move, copy, or integrate data from legacy applications and data stores to the new application.

Figure 2B:
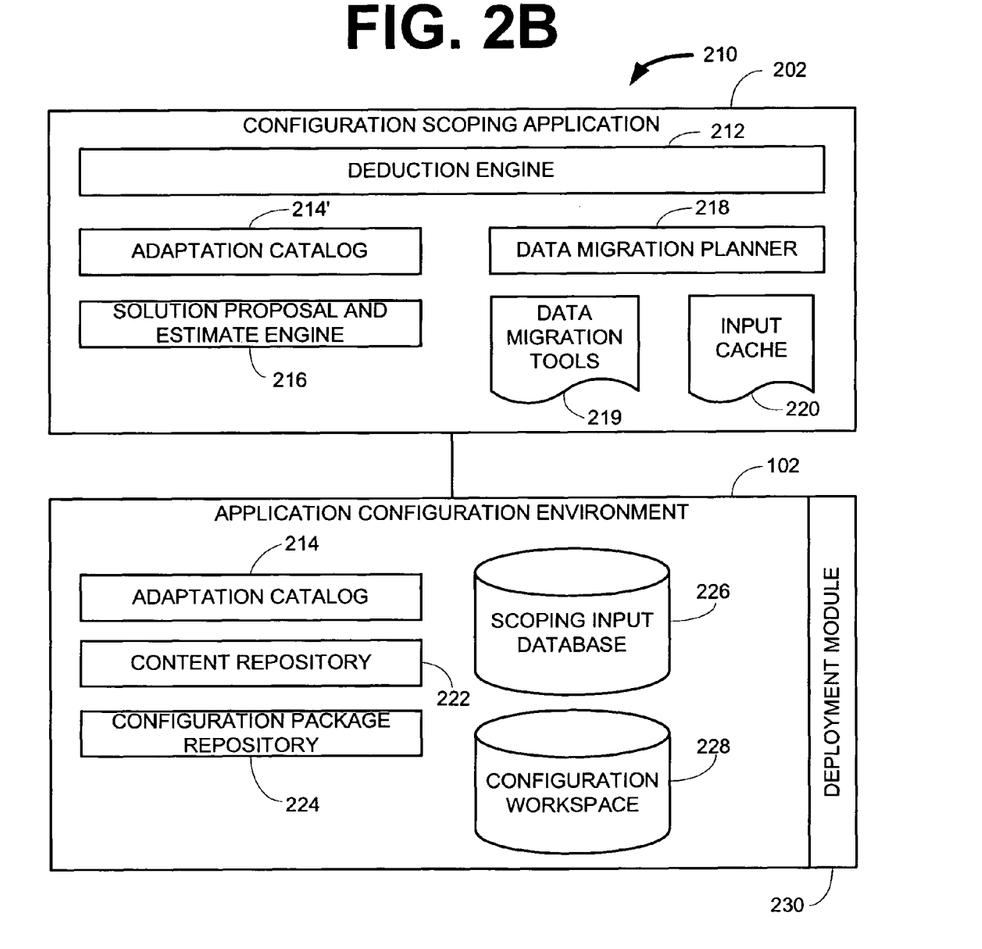
FIG. 2B is a block diagram of a system according to an example embodiment.

FIG. 2B is a block diagram of a system 210 according to an example embodiment. The system 210 includes the configuration scoping application 202 and the application configuration environment 102.

The configuration scoping application 202, in some embodiments, may include a deduction engine 212, and an adaptation catalog 214'. In this embodiment, the configuration scoping application 202 may further include a solution proposal and estimate engine 216, a data migration planner 218, data migration tools 219, and an input cache 220.

The application configuration environment 102, in some embodiments, may include an adaptation catalog 214, a content repository 222, and a configuration package repository 224. In some such embodiments, the application configuration environment 102 may further include a scoping input database 226, a configuration workspace 118, and a deployment module 230.

The adaptation catalog 214 may include a representation of all of the solution capabilities of an application to be configured, and eventually executed. Each capability of an application to be configured is identified in an adaptation catalog 214 entry. The adaptation catalog 214 entries each may be identified as an area, package, topic, or option and may be organized in a hierarchy with a child identifying the parent. An example hierarchy is a "General Ledger" capability, which in some embodiments typically is a package having two topics, "cash based" and "accrual based" which are two application capabilities within the "General Ledger" capability. In some embodiments, the adaptation catalog 214' entries may be encoded in a markup language, such as eXtensible Markup Language ("XML"), or by another proprietary standard or open standards based encoding standard.

The adaptation catalog 214 entries may further include scoping questions directed toward obtaining scoping information to determine what areas, packages, topics, and options are relevant to the user's needs. Additionally, the adaptation catalog entries typically include rules, the application of which can require inclusion or exclusion, or specify default inclusion or exclusion, of certain other areas, packages, topics, and options. Thus, because the areas, packages, topics, and options correlate to application capabilities, the inclusion, exclusion, and defaulting specifies what capabilities will be enabled and disabled in the application when deployed.

In some embodiments, rules and entries in the adaptation catalog can be linked to a configuration package that exists in the configuration package repository 224. A configuration package includes one or more configuration settings that enable or disable functionality of the application when deployed.

In one embodiment, the rules may be applied by the deduction engine 212 of the configuration scoping application 202. The configuration scoping application 202 typically presents a user interface to a user that requests answers to questions. The questions asked via the user interface are identified by the deduction engine 212 based on the adaptation catalog 214'. The adaptation catalog 214' is typically a copy of the adaptation catalog 214 of the application configuration environment 102. When an answer is received, the answer may be stored in the input cache 220 of the configuration scoping application 202. The deduction engine 212 then typically applies the rule associated with the adaptation catalog 214' entry of the question asked to the received answer. Through the application of the rule, in view of answers already received and rules already applied, the deduction engine 212 may be configured to identify a next question to ask. The identified question typically is then presented to the user through the user interface. This process may be configured to continue until either all of the questions have been asked or the user is out of time. If questions remain that have not been answered, the process can be continued at a later time or rules specifying default areas, packages, topics, and options in order to supply enough information to allow deployment of the application in a functional form.

In some embodiments, the configuration scoping application 207 further includes a data migration planner 218. In such embodiments, one or more additional scoping questions typically can be asked. These additional scoping questions may be directed toward obtaining information from the user about legacy systems and how data is stored within them. In some embodiments, the questions simply ask what systems are currently in use. In other embodiments, the questions are more detailed to obtain information such as what type of database a system is utilizing and what type of customization has been made or custom systems developed. In some embodiments, the scoping questions request information to identify one or more of data source types, data source connectivity information, location of certain data items within a data source, data item types, and information describing one or more data items. The data migration planner 218 typically uses the answers to these additional questions to propose a data migration plan to the new application.

The data migration planner 218, in some embodiments, may evaluate the answers to the scoping questions to identify legacy systems utilized and how the data is stored. The data migration planner 218 may also evaluates the scoping question answers to identify what data is needed, and in what form, in an application to be deployed, or otherwise proposed. The data migration planner 218 then typically makes a data migration plan recommendation utilizing one or more data migration tools 219. A copy of the data migration plan may be stored in the configuration workspace 228 or other data storage location accessible within or to the application configuration environment 102.

The data migration tools 219, in some embodiments, typically include a representation of one or more tools that may be utilized to migrate data from a legacy application to the new application. Such tools may include legacy application plugins that execute within a legacy system to move or copy data. Some tools also include a data migration process recommendation for extraction of files from a legacy system and uploading to the files to the data stores of the new application. Some other tools include integration tools that operate between a legacy application and the new application to facilitate sharing of data between the two applications. Other tools and tool types are contemplated as well. Such other tools typically include tools developed by third parties that leverage an open architecture of the system 210 to facilitate data migration and integration between a legacy application and the new application.

In some embodiments, the configuration scoping application 202 includes a solution proposal and estimate engine 216. The solution proposal and estimate engine 216 may be used in a sales situation. For example, if a sales person is discussing with a sales lead what a certain application product can do for the sales lead, the sales person typically can utilize the configuration scoping application 202 to obtain information about the needs of the sales lead via the scoping questions. The scoping question answers may then be utilized by the solution proposal and estimate engine 216 to make an initial determination of what will be involved if the sales lead decides to purchase the application. The solution proposal and estimate engine 216 normally is configured to output information for the sales lead to make several determinations, such as the size of effort necessary to implement or transition to the application from legacy system, the cost involved, and cost. In some embodiments, the output of the solution proposal and estimate engine 216 outputs one or more of an implementation cost estimate, an application solution proposal, and a recommended project roadmap. In some embodiments, the solution proposal and estimate engine 216 outputs a proposal for one or more other options, application descriptions, sales literature, benefit statements of using the application, and addition documents, such as a proposal of key performance indicators the application can monitor to assist in managing the application or enterprise of the sales lead.

After the scoping question have been answered, the answers, and any other information obtained from a sales lead or other user of the configuration scoping application 202, the information typically is uploaded to the application configuration environment 102. However, in embodiments, where the configuration scoping application 202 executes on the same computing device as the application configuration environment 202, the scoping question answers and other information may be stored directly to the application configuration environment 102.

When the configuration question answers and other information is uploaded, or otherwise stored to the application environment 102, the scoping question answers are stored to the scoping input database 226. The scoping question answers, in some instances, will be referred to interchangeably as the "scoping information."

After the scoping information is within the scoping input database 226, a process within the application configuration environment 102 may execute to begin configuring an application in the configuration workspace 228. The configuration workspace typically includes a set of configuration tables that mirrors, at least in part, the configuration tables of the application.

The process that configures the application may determine one or more configuration packages to instantiate in the configuration workspace 228. Configuration packages, in some embodiments, may include one or a set of configuration settings to enable or disable certain capabilities of the application. Configuration packages, as mentioned above, may be linked to adaptation catalog 214 entries and rules associated with adaptation catalog entries. Thus, the process that configures the application in the configuration workspace 228 may be configured to query the scoping information in the scoping input database 226 to identify configuration packages to instantiate.

In some embodiments, demonstration data may exist to facilitate instantiation of a demonstration instance of the application for a sales lead, training session, or other purpose. The demonstration data, in some embodiments, is linked to one or more configuration packages from the configuration package repository 224. The demonstration data typically exists in the content repository 222 so that it can be copied into a set of application tables in the data repository 244 of the configuration workspace 228. These tables may hold such data as transactional data, operational data, master data, or other data that can exist in the application when the application is ready for execution or is executed.

Once the demonstration data is copied to the data repository 244, that data may be fine-tuned to more closely match the intended use of the demonstration data. For example, the system may be configured so that a sales person, or other individual, can fine-tune demonstration data values to more closely match a sales lead's expectations of the application. Such fine tuning may include modifying sales order documents in the demonstration data to include a name, address, and logo of the sales lead's enterprise, or other similar modifications to the demonstration data.

After the application has been configured in the configuration workspace and the demonstration data, if any, is ready, the configuration typically is deployed by the deployment module 230. The deployment module 230 may be configured to deploy configuration settings to a baseline application that has already been instantiated in an application execution environment. In some embodiments, the deployment module includes a configuration setting deployment process, an activation process, and a data deployment process. The configuration setting deployment process typically copies configuration settings from configuration tables in the configuration workspace 228. The data deployment process may be configured to execute if there is demonstration data in the configuration workspace 228. If there is demonstration data, the data typically is copied from the configuration workspace 228 to application tables in the application execution environment. Some embodiments further utilize the activation process.

The activation process, in some of such embodiments, executes to activate the application in the application execution environment after it has been successfully deployed. In some instances, the activation process requires an activation key, message, code, or other authorization from an activation authority to activate the application. The activation authority may be configured to include one or more of a number of individuals or entities. An example of an activation authority is an entity selling the application to be activated. This activation functionality requiring an activation key or other mechanism can be utilized for several purposes. Some of such purposes typically include allowing the entity selling the application to ensure the application is properly configured, has passed certain testing necessary for the entity to ensure it will meet guaranteed service level agreements or objectives, for billing purposes, or other purposes that can benefit from such an activation process.

In some embodiments, the deployment module 230 further includes a delta deployment process that is relevant only after an application has already been deployed. When an application is deployed, or subsequently modified, the scoping information in the scoping input database 226 typically is updated. In some embodiments, enables tracking of a current configuration of a deployed application. In embodiments including the delta deployment process, the scoping information typically is further tracked on a historical basis to at least allow a view of a current configuration and a modified configuration not yet deployed, if applicable. The delta deployment process then typically uses that historical tracking of the application configuration to identify changes between the current application configuration and the modified configuration not yet deployed. The delta deployment process then normally only deploys the changes to the application configuration.

Figure 3:
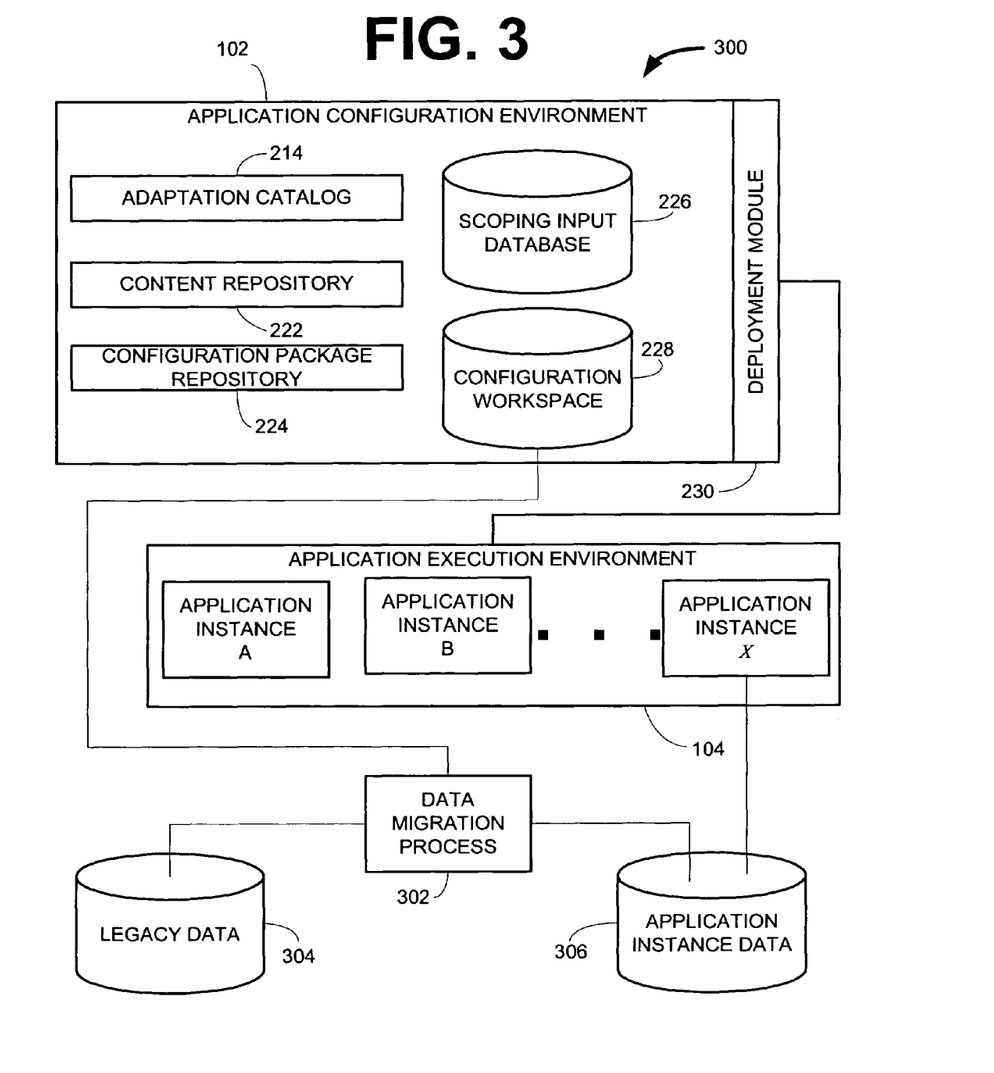
FIG. 3 is a block diagram of a system according to an example embodiment.

FIG. 3 is a block diagram of a system 300 according to an example embodiment. The system 300 includes the application configuration environment 102 as discussed above with regard to FIG. 1, FIG. 2A, and FIG. 2B. The system 300 further includes an application execution environment 104, a data migration process 302, legacy data 304, and application instance data 306.

The application execution environment 104 is a data processing environment within which an application, or an application to be deployed, can execute. When deploying an application, the deployment module 230 needs to know what application execution environment 104 and what application instance within that environment to deploy to. In embodiments including only one application execution environment 104, the application execution environment 104 may already be known. Similarly, in an application execution environment including only a single application instance, the instance may already be known.

Each instance of the application (i.e., application instances A, B, . . . X) typically includes a set of identical configuration tables which can include distinct configuration settings from one another. In some embodiments, multiple instances of the application exist to provide a development instance, a test instance, and a production instance. In such embodiments where there are multiple application instances, the deployment module 230 may be configured to deploy the configuration settings from one of the application instances in the application execution environment 104 to another application in the same or another application execution environment 104. Although the deployment module 230 is illustrated as being a part of the application configuration environment 102, the deployment module 230, in other embodiments, can be a standalone application or a part of another application or process.

The data migration process 302, in some embodiments, in configured to migrate legacy data 304 to application instance data 306. In some such embodiments, the data migration process 302 may be a legacy application plugin, or other process, that executes within the legacy application to migrate the data. In other embodiments, the data migration process 302 may be a plugin, or other process, that executes within an application instance to migrate the data. In yet further embodiments, the data migration process 302 may be a data integration process that makes data from the legacy system available to an application instance and vice-versa.

The data migration process 302, in some embodiments, is configured to identify data to migrate based upon the data migration plan stored in the configuration workspace 228 of the application execution environment 102. In some such embodiments, the data migration plan may identify not only data items to move, but any data item type conversions that might be necessary, such as converting a string data item type to an integer or a string data item length.

Some embodiments may include more than one data migration process 302. In such embodiments, the data migration processes may be of varying types. For example, one data migration process 302 may be an application plugin, while another data migration process 302 may be a standalone application that executes to move or copy data between applications.

In some embodiments, the data migration process 302 may be leveraged for additional purposes. One such purpose may be to move data from application instance, such as application instance A, to another application instance, such as application instance B. Such a move may be useful when performing application instance upgrades or for copying data from a production instance to a test or development instance.

Figure 4:
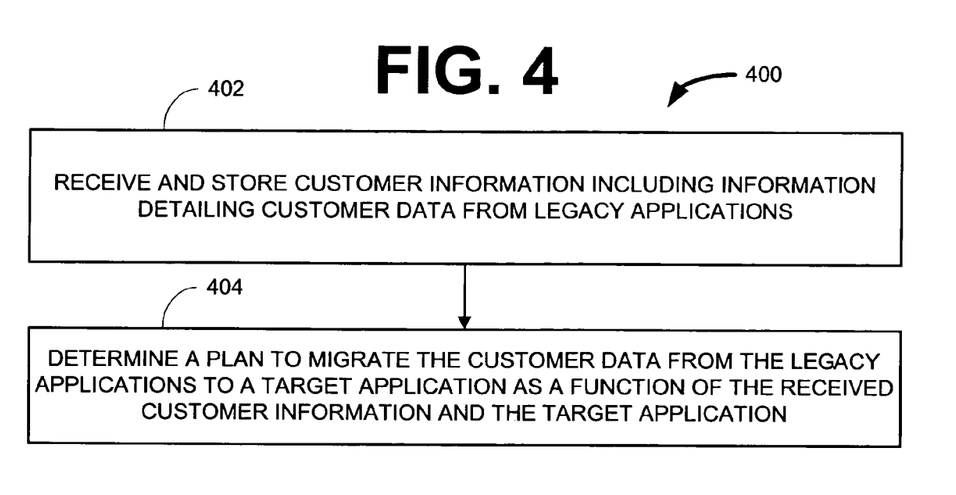
FIG. 4 is a flow diagram of a method according to an example embodiment.

FIG. 4 is a flow diagram of a method 400 according to an example embodiment. The example method 400 includes receiving and storing customer information including information detailing customer data from legacy applications 402. The method 400 further includes determining a plan to migrate the customer data from the legacy applications to a target application as a function of the received customer information and the target application 404. Some embodiments further include asking data migration planning questions and receiving answers through a user interface, wherein the received answers identify one or more customer data migration preferences or requirements.

The data migration planning question answers identify customer data source information. The customer data source information can include one or more of data source type, data source connectivity information, locations of data items within the data source, data item types, data item descriptive information, and other data source information. In some embodiments, the data migration planning question answers provide information to identify data sources within one or more customer legacy applications and target application data destinations for the customer data.

The method 400, in yet further embodiments, includes providing a recommendation of one or more data migration tools to migrate data from the customer legacy applications to the target application, wherein recommended data migration tools are identified as a function of the data migration planning question answers and scoping information. The plan to migrate the customer data from the legacy application to a target application can include a file format for at least a portion of the customer data and identify a data loading process to load data from a file in the file format to the target application.

Figure 5:
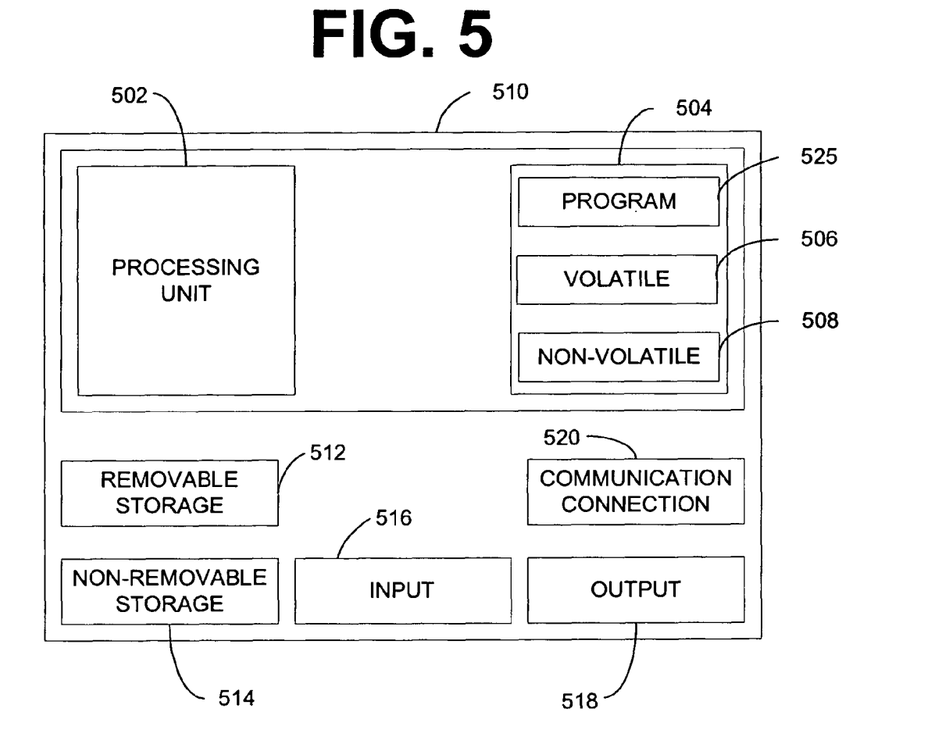
FIG. 5 is a block diagram of a system according to an example embodiment.

FIG. 5 is a block diagram of a computing system according to an example embodiment. In one embodiment, multiple such computer systems are utilized in a distributed network to implement multiple components in a transaction-based environment. An object-oriented architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium. For example, a computer program 525 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 510 to provide generic access controls in a COM based computer network system having multiple users and servers.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A system comprising:
    a processor;
    a data storage device;
    a customer profiling application stored on the data storage device and executable by the processor, wherein the customer profiling application when executed by the processor:
        with regard to a target application to be deployed:
            receives scoping information for configuration of the target application to be deployed in response to scoping questions presented via a user interface; and
            generates and stores a configuration for the target application to be deployed within a configuration workspace stored on the data storage device; with regard to legacy applications:
            asks questions through a user interface regarding legacy applications in use;
            receives answers to the questions through the user interface; and
            stores, on the data storage device, the received answers as customer information including information detailing customer data from legacy applications; and
    a data migration planning process stored on the data storage device and executable by the processor, wherein the data migration planning process when executed by the processor:
        determines a plan to migrate the customer data from the legacy applications to the target application as a function of the configuration of the target application to be deployed stored in the configuration workspace and the stored customer information detailing the customer data from the legacy applications; and
        stores the plan to migrate the customer data from the legacy applications to the target application in the configuration workspace stored on the data storage device.

2. The system of claim 1, wherein the data migration planning process identifies customer data source information including at least one of:
    data source type;
    data source connectivity information;
    locations of data items within the data source;
    data item types; and
    data item descriptive information.

3. The system of claim 1, wherein the data migration process identifies data sources within at least one customer legacy application and at least one target application data destination for the customer data.

4. The system of claim 1, wherein the data migration process provides a recommendation of at least one data migration tool to migrate data from the customer legacy applications to the target application.

5. The system of claim 4, wherein the at least one data migration tool includes at least one legacy application plugin.

6. The system of claim 4, wherein:
    the plan to migrate the customer data from the legacy application to the target application includes a file format for at least a portion of the customer data; and
    identifies a data loading process to load data from a file in the file format to the target application.

7. A method comprising:
    receiving scoping information for configuration of a target application to be deployed in response to scoping questions presented via a user interface;
    generating and storing, on a data storage device, a configuration for the target application to be deployed within a configuration workspace;
    receiving and storing, on the data storage device, customer information including information detailing customer data from legacy applications, the customer information received in response to data migration planning question and received through a user interface, the received customer information identifying at least one customer data migration preference;
    determining a plan to migrate the customer data from the legacy applications to the target application as a function of the received customer information and the configuration for the target application to be deployed; and
    storing, on the data storage device, the plan to migrate the customer data from the legacy applications to the target application to be deployed.

8. The method of claim 7, wherein the data migration planning question answers identify customer data source information including at least one of:
    data source type;
    data source connectivity information;
    locations of data items within the data source;
    data item types; and
    data item descriptive information.

9. The method of claim 7, wherein the customer information provides information to identify data sources within at least one customer legacy application and at least one target application data destination for the customer data.

10. The method of claim 7, further comprising:
    providing a recommendation of at least one data migration tool to migrate data from the customer legacy applications to the target application, wherein recommended data migration tools are identified as a function of the data migration planning question answers.

11. The method of claim 10, wherein the at least one data migration tool includes at least one legacy application plugin.

12. The method of claim 10, wherein:
the plan to migrate the customer data from the legacy application to a target application includes a file format for at least a portion of the customer data; and
identifies a data loading process to load data from a file in the file format to the target application.

13. A machine-readable storage medium, with encoded instructions, which when executed, cause a machine to:
receive scoping information for configuration of a target application to be deployed in response to scoping questions presented via a user interface;
generate and store a configuration for the target application to be deployed within a configuration workspace;
receive and store customer information including information detailing customer data from legacy applications, the customer information received in response to data migration planning question and received through a user interface, the received customer information identifying at least one customer data migration preference;
determine a plan to migrate the customer data from the legacy applications to the target application as a function of the received customer information and the configuration for the target application to be deployed; and
store the plan to migrate the customer data from the legacy applications to the target application to be deployed.

14. The machine-readable storage medium of claim 13, wherein the customer information provides information to identify data sources within at least one customer legacy application and at least one target application data destination for the customer data.

15. The machine-readable storage medium of claim 13, wherein the instructions, when further executed, cause the machine to:
provide a recommendation of at least one data migration tool to migrate data from the customer legacy applications to the target application, wherein recommended data migration tools are identified as a function of the data migration planning question answers.

16. The machine-readable storage medium of claim 15, wherein the at least one data migration tool includes at least one legacy application plugin.

17. The machine-readable storage medium of claim 15, wherein:
the plan to migrate the customer data from the legacy application to a target application includes a file format for at least a portion of the customer data; and
identifies a data loading process to load data from a file in the file format to the target application.

\* \* \* \* \*